A. W. WARNOCK.
CASTER.
APPLICATION FILED OCT. 9, 1920.
1,421,626.
Patented July 4, 1922.
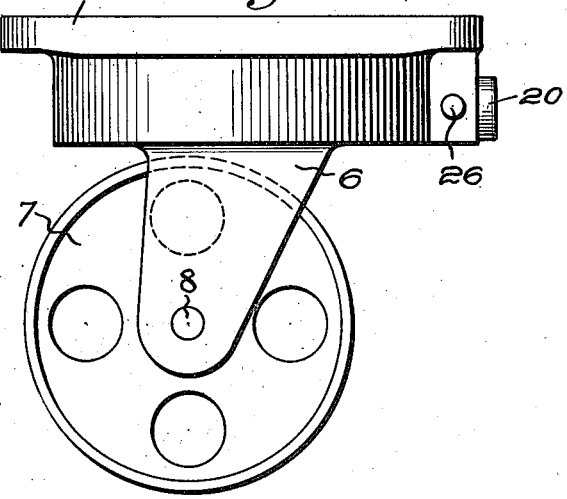
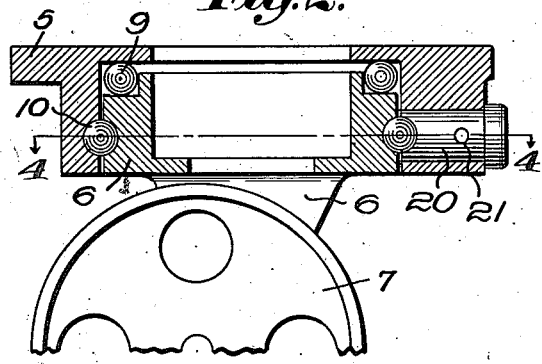
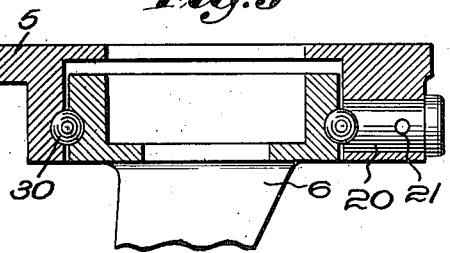
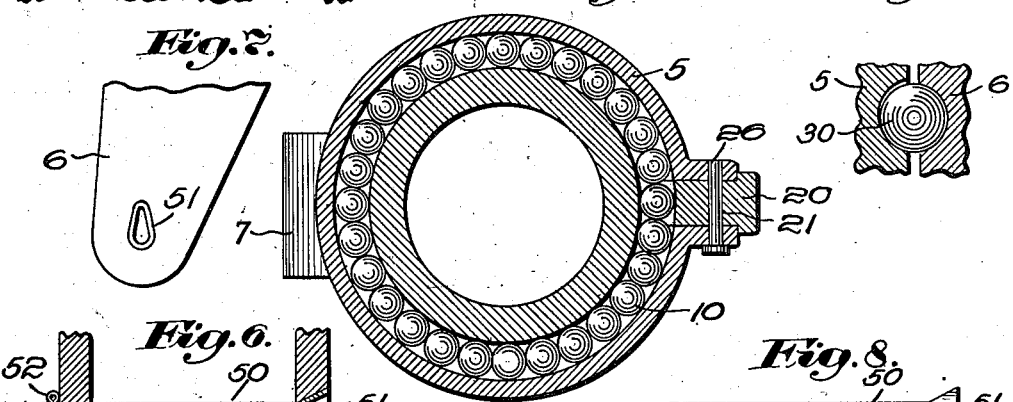
Inventor:
Amos W. Warnock
by Emery Booth Janney Varney
Atty's

UNITED STATES PATENT OFFICE.

AMOS W. WARNOCK, OF EVERETT, MASSACHUSETTS, ASSIGNOR TO ECONOMIC STEEL RACK COMPANY, OF EVERETT, MASSACHUSETTS, A CORPORATION OF MASSACHUSETTS.

CASTER.

1,421,626.   Specification of Letters Patent.   Patented July 4, 1922.

Application filed October 9, 1920. Serial No. 415,711.

*To all whom it may concern:*

Be it known that I, AMOS W. WARNOCK, a citizen of the United States, and a resident of Everett, in the county of Middlesex and State of Massachusetts, have invented an Improvement in Casters, of which the following description, in connection with the accompanying drawings, is a specification, like characters on the drawings representing like parts.

This invention pertains to improvements in casters. It is among the objects of the invention to provide a caster in which the swiveling movement is very free and which may be at the same time of simple construction with great strength.

Referring to the drawings, which show a preferred form of one illustrative embodiment of my invention and a modification thereof:—

Figure 1 is a side elevation of a caster;

Fig. 2 is a central, vertical section therethrough, being partly in elevation;

Fig. 3 is a central, vertical section showing a modification;

Fig. 4 is a section on the line 4—4 of Fig. 2;

Fig. 5 is a diagrammatic view illustrating a preferred cross-section of ball race for use in connection with my invention, especially, though not exclusively, in connection with that embodiment thereof illustrated in Fig. 3; and Figs. 6, 7, 8 and 9 illustrate details of the caster wheel axle mounting.

Referring to the drawings and to the preferred forms of my invention selected for illustrative purposes, I have shown a caster primarily, though not exclusively, adapted for use on heavy mill trucks and the like and including an outer frame 5 adapted to be bolted or otherwise secured to the truck frame or other parts supported by the caster, and a swiveled frame 6 carrying a caster wheel 7 rotatable about a horizontal axis 8 situated at a point considerably at one side of the axis of the swiveled frame 6 but preferably, as shown, so located that a vertical plane therethrough will intersect the swiveled frame 6.

In the form of my invention illustrated in Fig. 2, which is primarily intended for heavy loads and rough work, I have provided an upper set of balls 9 and a lower set of balls 10, the upper set 9 being arranged in a circle whose radius is somewhat smaller than the radius of the circle formed by the lower set of balls 10. The upper ball race 9 is preferably, as shown, adapted primarily to provide a thrust bearing to receive the greater part of the weight carried by the caster, while the lower ball race 10 is adapted primarily to receive side thrusts and to facilitate swiveling of the caster. The bore of the outer frame 5 may be substantially constant except where increased for the provision of preferably one-half of the race for the balls 10, and where decreased to provide a bearing surface for the set of balls 9. The periphery of that portion of the inner frame 6 which enters the outer frame 5 may be substantially cylindrical and of constant diameter except where reduced to provide one-half of the race for the balls 10 and where reduced to provide a bearing surface for the set of balls 9.

The caster illustrated in Fig. 2 may be conveniently assembled by initially inserting the ring of balls in the frame 5, while inverted, after which the inner frame 6 may be introduced into the outer frame 5 and the set of balls 10 may be introduced, preferably through a lateral aperture in the outer frame 5, this lateral aperture being later closed by a plug 20 having a transverse hole 21 therethrough adapted to receive a locating pin 26 which also passes through a portion of the outer frame 5 so that the position of the inner end of the pin 20 relative to the race may be accurately determined. The pin 20 is preferably in place when the adjacent race in the outer frame 5 is turned so that the inner end of the pin will provide a bearing surface continuing and conforming to the outer portion of the race to contain the balls 10.

The balls 10 hold the inner and outer frames of the caster in assembled relationship, take the lateral strains and may on occasion receive considerable strain at an angle neither horizontal nor vertical. The balls 9, however, relieve the balls 10, shown in Fig. 2, of any substantial strain approaching a shearing strain.

In the modification shown in Fig. 3, the upper balls 9 are omitted. This construction is primarily adapted for use on work considerably lighter than the maximum for which the construction shown in Fig. 2 is adapted. The balls 30 in Fig. 3 take both the strains arising from the weight carried by the caster and also lateral strains.

Some clearance must necessarily be provided to admit of introduction of the balls into the race. I have found that it is of advantage to turn one of the races to provide sufficient clearance so that the ball cannot touch both corners of the race, and to turn the other race somewhat smaller so that the ball will bear on both margins of the race. The race providing the clearance may be either the inner or outer race, but I prefer that it be the inner race. The outer race in its downward movement will then crowd each ball toward the inner race and the ball bearing at the two edges of the inner race will form a seat or track in which it will remain substantially constantly and wherein more than one point of contact is provided. Where, on the other hand, both portions of the race are turned somewhat larger to provide a clearance, the varying resolution of forces will cause the ball to travel in different tracks so that a less satisfactory bearing surface is provided.

In Fig. 5, I have shown a diagrammatic section through a preferred form of race illustrating the preferred arrangement of clearances.

I have found it of marked advantage in facilitating assembly and replacement to mount the caster on a readily removable axle of inexpensive construction typified by the construction illustrated in Figs. 6, 7, 8 and 9 wherein the axle 50, which may be hollow, is swaged at one end to provide a lip 51 entering a corresponding recess in the frame 6 to prevent rotation of the axle in the frame and to prevent displacement of the axle in the frame toward the left as viewed in Fig. 6. A cotter-pin 52 may hold the axle in its assembled relation to the frame. The axle may be solid, but I prefer that it be hollow, as where made from pipe, this facilitating the swaging thereof to the desired shape, and, if desired, permitting the drilling, pugging and tapping of the axle to admit of lubrication from a grease cup, gun or other lubricating device.

While I have shown and described a preferred form of one embodiment of my invention, it will be understood that changes involving omission, substitution, alteration and reversal of parts, and even changes in the mode of operation, may be made without departing from the scope of my invention, which is best defined in the following claims.

Claims:

1. A caster having a housing, a frame swiveled interiorly of said housing, a wheel having an axle carried by said frame out of center thereof, and an annular series of balls providing a bearing between said housing and frame, said balls holding said housing and frame in assembled relationship, the annulus of said series of balls of such radius that a vertical plane through the axis of the axle of said wheel will intersect said annulus.

2. A caster having a housing, a frame swiveled in said housing, a wheel having an axle carried by said frame out of center thereof and an annular series of balls providing a bearing between said housing and frame, said balls holding said housing and frame in assembled relationship, said housing providing a lateral aperture for introduction of said balls, and a closure for said aperture whereby all the balls are secured by said closure against displacement from their annulus while permitting free swiveling of the frame.

3. A caster having a housing providing a recess therein, one side of a ball race in the housing adjacent said recess, a swivelling frame having a projecting portion loosely fitting said recess, the other side of said ball race in said projecting portion, a series of balls in said ball race providing a lateral ball bearing, and means permitting introduction of said balls to said race after the caster is fixed to an article which it is to support.

4. A caster having a housing providing a recess therein, one side of a ball race in the housing adjacent said recess, a swivelling frame having a projecting portion loosely fitting said recess, the other side of said ball race in said projecting portion, and a series of balls in said ball race providing a lateral ball bearing, said housing and said frame also providing bearing surfaces for an annular thrust ball bearing, said thrust ball bearing of smaller effective diameter than said recess and said lateral ball bearing of substantially the same effective diameter as said recess.

5. A caster comprising, in combination, a frame having arms, a wheel between said arms, and a tubular axle passing through said wheel and secured to said arms, one end of said axle eccentrically expanded to provide lug means engaging a depression in one of said arms to prevent rotation of said axle and to prevent axial movement thereof in one direction, and the other end of said axle provided with securing means to prevent axial displacement of said axle in a direction toward said lug means.

In testimony whereof, I have signed my name to this specification.

AMOS W. WARNOCK.